United States Patent
Pitz

(10) Patent No.: US 6,470,459 B1
(45) Date of Patent: Oct. 22, 2002

(54) HALF-WORD SYNCHRONIZATION METHOD FOR INTERNAL CLOCK

(75) Inventor: Jeanne Krayer Pitz, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/450,822

(22) Filed: Nov. 29, 1999

(51) Int. Cl.[7] .............................................. G06F 1/04
(52) U.S. Cl. ...................................... 713/400; 713/600
(58) Field of Search ................................ 713/400, 401, 713/500, 501, 503, 600; 710/62, 65, 66

(56) References Cited

U.S. PATENT DOCUMENTS

| | | | | |
|---|---|---|---|---|
| 5,014,237 A | * | 5/1991 | Masters et al. ............. | 364/900 |
| 5,465,338 A | * | 11/1995 | Clay .......................... | 395/310 |
| 5,696,993 A | * | 12/1997 | Gavish ....................... | 395/882 |
| 6,055,285 A | * | 4/2000 | Alston ....................... | 375/372 |

* cited by examiner

*Primary Examiner*—Dennis M. Butler
(74) *Attorney, Agent, or Firm*—W. Daniel Swayze, Jr.; W. James Brady; Frederick J. Telecky, Jr.

(57) ABSTRACT

An interface circuit (10) for use in a read channel of mass data storage device and which is synchronous with a clock (CLK8) of the mass data storage device operates to receive data (12) coming into the circuit (10) controlled by an associated controller. The circuit (10) is easily configurable to process either a full word length at once, or by half-word portions. In the half-word mode, the data coming into the circuit is clocked into one of three data registers (18, 36, 38). When a flag (NZH, NZL) that indicates that data is starting is detected, the phase of the received data with respect to the clock is determined by comparing (50) the phase of the full word clock (CLK8) to the phase of a half-word clock (CLK4). If the clocks are in-phase, the first two registers (18,36) are selected to contain respective halves of the data word. If the clocks are out-of-phase, the second two registers (36,38) are selected to contain the respective halves of the data word. The word halves are directed by multiplexers to output registers (26,28) for delivery to the channel (14) of the mass data storage device.

20 Claims, 4 Drawing Sheets

HALF-WORD SYNCHRONIZATION METHOD FOR INTERNAL CLOCK

BACKGROUND OF THE INVENTION

1. Field of the Invention

This invention relates to improvements in interface circuitry for passing a digital data word from one system to another, and more particularly to improvements in interface circuitry for passing a digital data word in half-word portions from a system under control of a controller, or the like, to a read channel of a mass data storage device, or the like, for writing to a data storage medium thereof in synchronism with a clock signal internal to the read channel.

2. Relevant Background

In mass data storage devices, typically data is read from a data storage device, such as a hard disk drive, or the like, on which it is stored. The data is processed in a read channel, in which various data recognition, modification, and filtering processes are preformed, after which, the data is delivered to a controller for use in an associated computer or other system. Conversely, when data is to be written to the data medium, it is delivered under the control of the controller to the read channel, which performs other data modification processes to the data, and the data is delivered to the data transducers or heads to be written onto the data medium.

Typically, an interface circuit is provided between the read channel and the controller to receive data to be written to the storage medium via the read channel. In this process, data is typically sent in packets. Between packets, however, the controller causes data values of only zero to be transmitted to the read channel. When the data transmission is first initiated, a non-zero word is transmitted to the read channel for detection by the read channel to enable the necessary data receiving signals and mechanisms to be set up to receive the succeeding data words.

The interface for the read channel to the controller is essentially asynchronous, since the read channel device has no a priori knowledge of when the data will be transferred. The read channel device generates the clock for the external controller device so it can synchronize data sent to it via the interface. The external controller is generally much slower than the read channel device, so it cannot respond as fast as the read channel device.

Also, in the past, interface circuits of the type described typically are individually or custom designed for each particular application in which they are used. One of the reasons for this is that some systems transfer data in complete word formats, whereas others transmit data in half-word nibbles, which requires different circuitry and signal processing from the entire word. This is primarily done to reduce the number of pins required to transfer data.

The tradeoff, however, is that the data transferred in half-word nibbles needs to be sent by the controller at twice the speed of the full word transfer.

What is needed therefore is an interface circuit that is portable among different configurations so that it can be easily configured to transfer either whole or half-word portions of the signal being processed.

SUMMARY OF THE INVENTION

One of the distinctions of this circuits and the prior art is that this circuit provides a clock that is sent to a controller or microprocessor, and the controller or microprocessor synchronizes the data transmitted to the interface circuit based upon the clock provided by the interface circuit.

It is therefore an advantage of the invention to be enabled to provide an interface circuit that can be easily selectively configured to receive data in either full or half-word portions.

It is another advantage of the invention to be enabled to provide an interface circuit that can receive data in portions, for example half-word portions, that is portable and easily configurable between chip designs.

In light of the above, therefore, according to a broad aspect of the invention, an interface circuit is provided to interface data that is transmitted in either full or half-word portions from a controller to a data user. In the half-word mode, a first half-word data input register receives a data word in sequential half-word portions. The first half-word data input register is clocked by a first clock signal. At least second and third data registers, each clocked by the first clock signal, are connected to sequentially receive the portions of the data word from the first data register to form a data pipeline. First and second data output registers, each clocked by a second clock signal at a frequency half that of the first clock signal, deliver data therein to the data user. First and second multiplexers having outputs are respectively connected to the first and second data output registers. Each has outputs selected from the first, second, and third registers connected to inputs thereof. A controller controls the multiplexers to pass selected outputs from the first, second, and third registers. The controller determines in which of the three registers the data word portions are contained, based upon the relative phase of the first and second clock signals with respect to the time that the data word was received.

According to another broad aspect of the invention, a half-word synchronous interface circuit is provided to interface a data word that is transmitted in half-word portions from a controller to a data user. The circuit includes a first half-word data input register for receiving a data word in sequential half-word portions, clocked by a first clock signal. At least second and third data registers, each clocked by the first clock signal, are connected to sequentially receive the portions of the data word from the first data register. First and second data output registers, each clocked by a second clock signal at a frequency half that of the first clock signal, deliver data therein to the data user. First and second multiplexers have outputs respectively connected to the first and second data output registers, and each having outputs from the first, second, and third registers connected to inputs thereof. A controller controls the multiplexers to pass selected outputs from the first, second, and third registers. The controller is operative to determine in which of the three registers the data word portions are contained, based upon the relative phase of the first and second clock signals with respect to the time that the data word was received.

According to yet another broad aspect of the invention, a method for interfacing a data word that is transmitted in half-word portions from a controller to a data user is provided. The method includes providing clock signals to control a transfer of the data at a first and second clock frequencies, the first clock frequency being half the second clock frequency. The method also includes determining whether the first and second clock frequencies are in-phase or out-of-phase when first and second half-word portions of a data word are received. The method also includes selectively and concurrently outputting the half-word portions of the data word in a proper order depending upon whether the first and second clock frequencies were determined to be in-phase or out-of-phase. In one embodiment, the method includes clocking first and second nibbles of the data word into respective first and second registers, or second and third registers depending upon whether the first and second clock frequencies are in-phase or out-of-phase for selective output therefrom.

BRIEF DESCRIPTION OF THE DRAWINGS

The inventions illustrated in the accompanying drawings, in which.

In the various figures of the drawing, like reference numerals are used to denote like or similar parts.

DETAILED DESCRIPTION OF THE PREFERRED EMBODIMENTS

Figure 1:
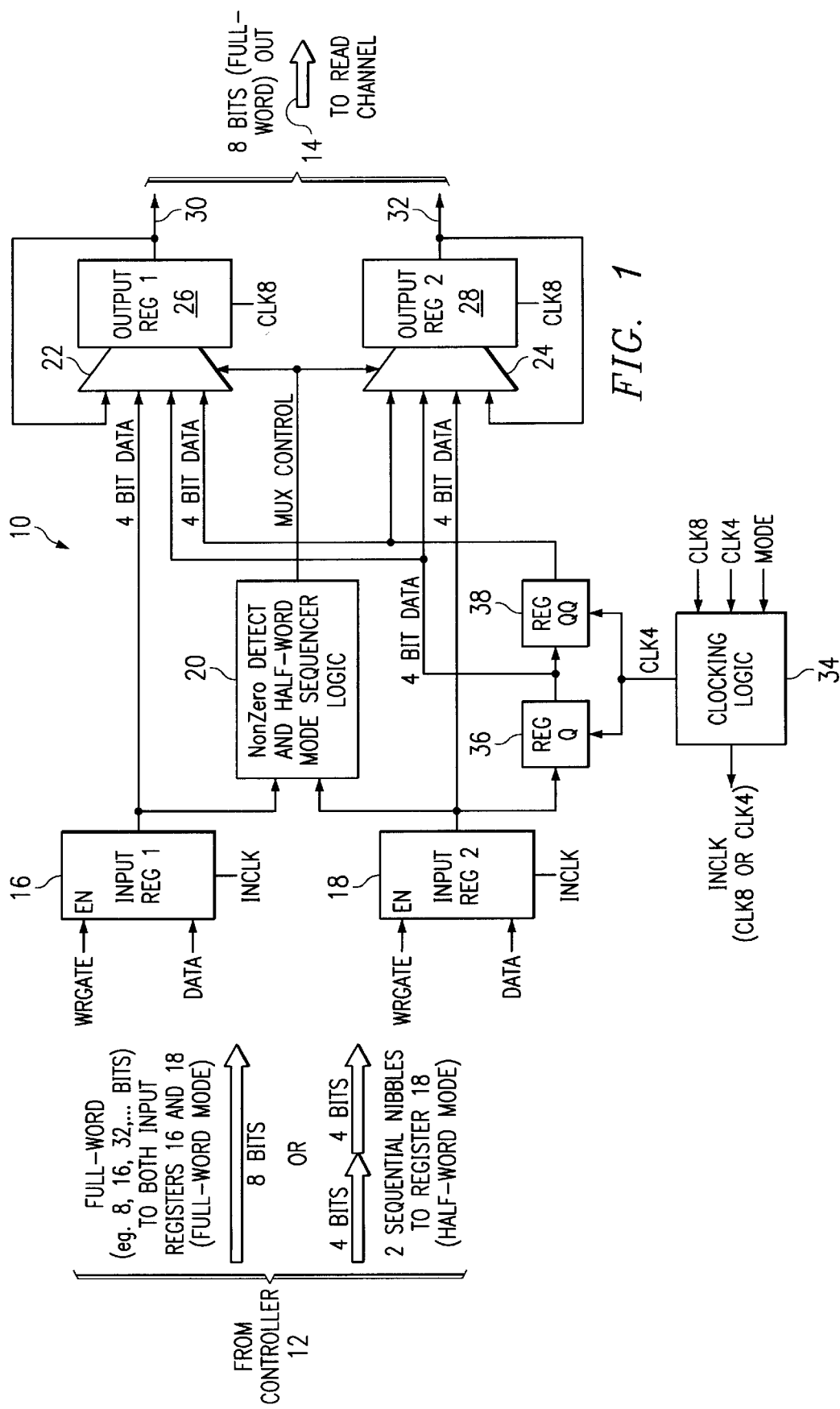
FIG. 1 is a block diagram of an interface circuit between a controller and a read channel of a mass data storage device, according to a preferred embodiment of the invention.

The interface circuit 10, according to a preferred embodiment of the invention, is shown in FIG. 1. The circuit 10 includes two 4-bit input registers 16 and 18, and two 4-bit output registers 26 and 28, which can receive an 8-bit wide input data byte across them in a full-word mode of operation. The output registers 26 and 28 are clocked by a clock signal, CLK8, and the input registers 16 and 18 are clocked either by CLK8 or CLK4, which is 2× of the frequency of CLK8, depending on whether the circuit 10 is operated in the full-word or half-word mode of operation, as will become apparent. Additionally two 4-bit data registers Q 36 and QQ 38 are provided to form a pipeline for the 4-bit (half-word) nibble transfer mode. These are clocked by CLK4.

Once data is clocked into the input registers 16 and 18, a glitch free entry is provided to the rest of the data pipeline. The input registers 16 and 18 are enabled by a signal called WRGATE, which is raised asynchronously by the external control device when it wants to begin a transfer of data. Because the external controller is much slower than the read channel device, it needs an undermined number of clocks cycles to adjust to the clock frequency, INCLK, of the read channel devices. Meanwhile, it sends all zeros on the bus.

As mentioned, the interface circuit 10 is used, for example, to synchronously interface data to be written under the control of a controller, or the like, on the left, to the read channel of the mass data storage device, or the like, on the right, as shown by the respective arrows 12 and 14. A non-zero detect and half-word mode sequencer logic circuit 20 provides select signals to first and second multiplexers 22 and 24 to selectively direct the data, in the full word mode, to output registers 26 and 28, and in the half-word mode from selected register pairs 18 and 36 or 36 and 38, as below described in detail. The output from the output registers 26 and 28 are delivered on the output lines 30 and 32 for delivery to the read channel of the associated mass data storage device.

In the 8-bit (full-word) mode described, the input register input 16 and 18 are clocked by the signal INCLK, which is predeterminedly selected by clocking logic circuit 34. Thus, in the 8-bit mode, the input signal is merely directly transferred from the input registers 16 and 18 to the output registers 30 and 32 for delivery to the data recording media. The INCLK and CLK8 are the same clock only slightly delayed from each other. This delay is assured to be less than the delay in the data path itself so no false clocking will occur.

On the other hand, when the circuit 10 is operated in the half-word mode, in the embodiment illustrated being a mode in which two 4-bit nibbles of the input word are sequentially received as half-words, only the lower input register 18 is used to receive the nibbles of the words. In the 4-bit mode, the transfer is slightly more complicated than in the full-word mode. The most significant nibble is sent first in each byte. The data must be formatted into an 8-bit byte inside the interface before it can be sent into the rest of the data pipeline in the read channel. That is, the byte must be formed into the output registers 26 and 28 so that the read channel device can process it from that point on the same as if it came in 8-bit bytes. To form this byte synchronously, the two registers, Q 36 and QQ 38 are provided to form a pipeline for the 4-bit mode.

In the half-word mode, the frequency of the clock signal INCLK is at twice the frequency of the clock of the output registers 26 and 28, CLK8. The pipeline registers Q 36 and QQ 38 are clocked by 2× frequency CLK4 to sequentially clock the input data first from input register 18 to register Q 36, then to clock the contents of register 36 to register QQ 38. Since the clock phase of the received word is unknown, three registers are employed to enable the selection of the input word, regardless of the phase at which the word is completely received, in a manner below described in detail.

Still more particularly, if the two nibbles of the input word are received in-phase with the clocking frequency of the output registers 30 and 28, the multiplexers 22 and 24 are configured to deliver the contents of input register 18 and of register Q 36 respectively to output registers 26 and 28 for output to the read channel. On the other hand, if the nibbles of the input word are received out-of-phase with the clocking frequency of the output registers 30 and 28, the multiplexers 22 and 24 are configured to deliver the contents of register Q 36 and register QQ 38 respectively to the output registers 26 and 28 for output to the read channel.

The operation of the circuit is dependent upon the bus protocol established on the read channel device. The bus protocol begins with the external controller device raising WRGATE, and on the falling edge of the INCLK, it outputs data to the circuit 10. The bus is driven to zeros by the controller, until "real" data is ready. At that time, a marker byte is sent to the read channel to identify when real data steam is to begin. The marker byte is any non-zero value, is removed from the data stream by the interface, and is not written onto the disk. After the marker byte, real data is sent to be written to the disk.

Figure 2:
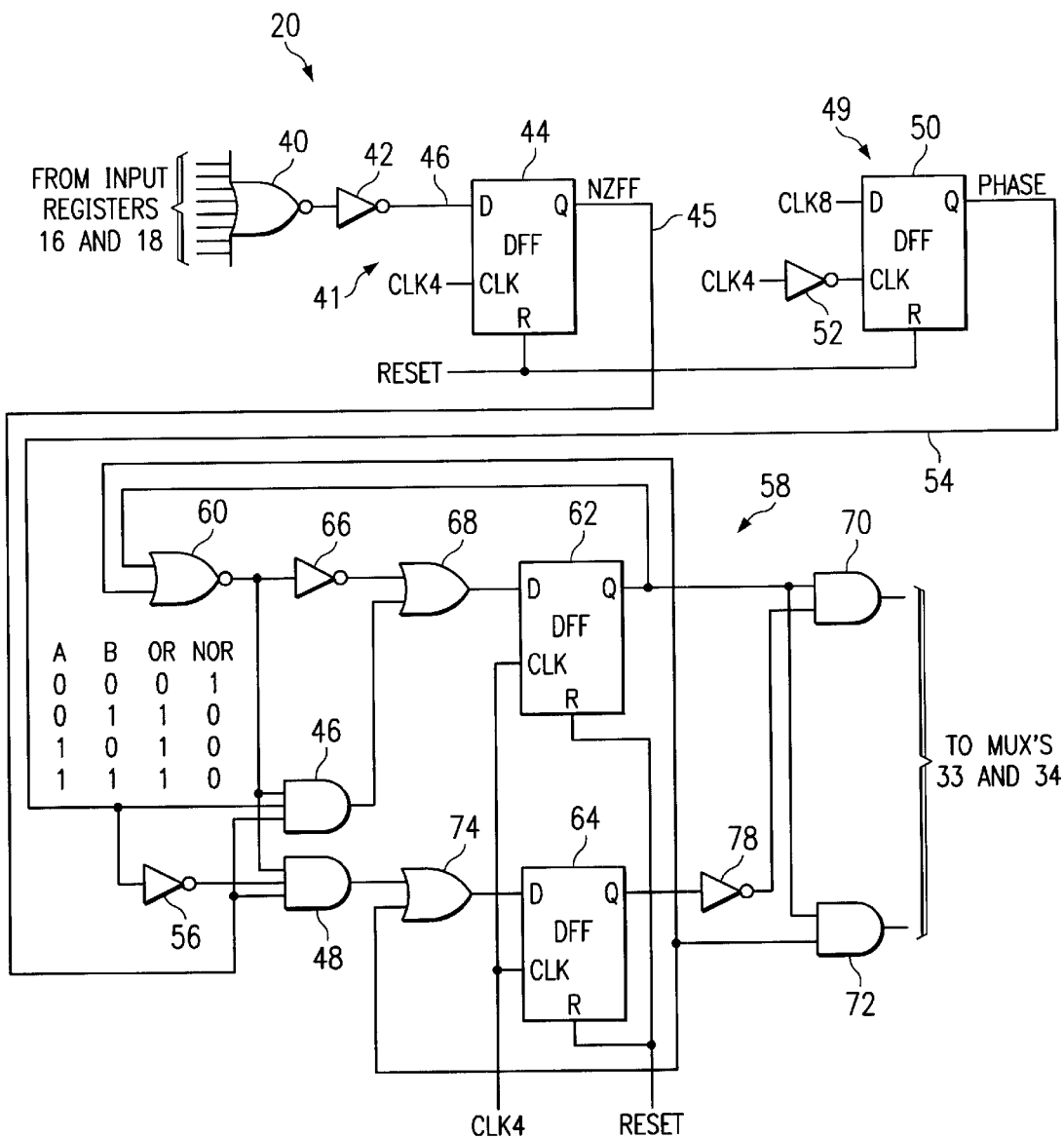
FIG. 2 is a block diagram of a non-zero detect and half-word mode sequencer logic circuit used in the interface of FIG. 1, according to a preferred embodiment of the invention.

Thus, the determination of the multiplexer selection of registers 36 and 38 or 18 and 36 is determined by the non-zero detect and half work mode sequence or logic 20, details of which are shown in FIG. 2 to which reference is now made. With reference now to FIG. 2, a block diagram of a non-zero detect half-word mode sequencer logic circuit 20, shown in FIG. 1, is illustrated. The circuit 20 determines whether the input word contained in the input registers 16 and 18 is non-zero. As explained elsewhere herein, between word bursts that are transmitted from the sequencer, the zeros are transmitted. The first non-zero word that is detected is discarded to enable subsequent words to be properly detected.

Thus, NOR gate 40 is provided to receive on its input terminals the signals at the output of the input registers 16 and 18. It should be noted that although all eight input bits are shown being applied to the inputs of the NOR gate 40, typically only four need be employed if the non-zero value used to signal the start of data is contained in the first non-zero word nibble sent, as is typically done.

The output of the NOR gate 40 is inverted by an inverter 42 to provide an input to the D input terminal of a D-type flip-flop 44. It can therefore be seen that the signal on line 46 will remain low so long as all of the inputs to the NOR gate 40 are low between data bursts. However, if any one or more of the inputs goes high, the signal on line 46 will also go high to provide a high input at the input of the D-type flip-flop 44 to be clocked therethrough upon the next rising edge of the 2 × clock, CLK4.

The output from the D-type flip-flop 44 is connected to one of the respective input terminals of AND gates 46 and 48. Consequently, the output signal, denoted NZFF, on line 45 of the D-type flip-flop 44 of the non-zero detector circuit 41 serves as an enable signal to enable signals to pass through the and gates 46 and 48 for signal processing below described in detail.

Figure 2A:
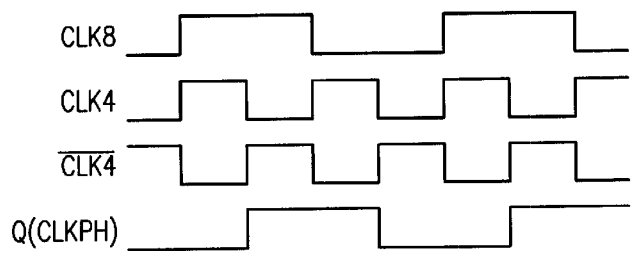
FIG. 2A is a graph of various signal waveforms generated in the operation of the circuit of FIG. 2.

The circuit 20 additionally includes a phase detector circuit 49, which includes a second D-type flip-flop 50, which receives the word clock frequency, CLK 8, on the D input, and which is clocked by the 2 × inverted clock on its clock input. The 2 × clock frequency CLK 4 is inverted by an inverter 52. Consequently, the output signal on output line 54 represents the phase of the CLK 4 clock with respect to the CLK 8 clock. More particularly, as can be seen in the timing diagram of FIG. 2A, when the clock signal CLK 4(bar) transitions from low to high, if CLK 8 is high the output will be high. On the other hand, if CLK 8 is low, the output will be low. The former condition is referred to herein as being "in-phase", and the latter condition is referred to herein is referred to herein as being "out-of phase".

The output line 54 is connected in noninverted form to an input of the AND gate 46, and in inverted form to an input of the AND gate 48. The signal on line 54 is inverted by an inverter 56 for application to the AND gate 48. It can therefor be seen that depending upon the state of the phase signal on line 54, either AND gate 46 or AND gate 48 will be operative to pass signals therethrough, while the other AND gate will be disabled therefrom.

When the first non-zero nibble is detected, it can occur in one of two phases of the CLK8: in-phase when CLK8 is high, or out-of-phase when CLK8 is low. Thus, the multiplexer control circuit 58 containing the non-zero detection line 45 and phase detection line 54, serves to configure the multiplexer circuits 22 and 24 of FIG. 1, depending upon the phase of the signals that are received from the controller.

The operation of the AND gates 46 and 48 is essentially as described above; however, it is noted that the multiplexer control circuit 58 includes a latch circuit, which, after being configured by the outputs from the phase and non-zero circuits 41 and 49, remains in the configuration to which that it has assumed. Thus, once the decision is made as to Phase 0 (out of phase) or Phase 1 (in-phase) the circuit stays in that configuration until the end of the data transfer, when WRGATE goes low and the entire interface is reset.

The latch is provided by a NOR gate 60, which has an output connected to inputs of the AND gates 46 and 48, as shown. The inputs to the NOR gate 60 are derived from the outputs of D-type flip-flops 62 and 64, described below in detail. Thus, if either of the outputs from the D-type flip-flops 62 and 64 changes from the zero reset value to a non-zero value, the output of the NOR gate 60 goes low to inhibit the passage of any further signals through the AND gates 46 and 48.

An inverter 66 also receives the output from the NOR gate 60 to invert it for application to an OR gate 68, which provides an input to the D type flip-flop 62. Thus, in addition to blocking passage of the signals through the AND gates 46 and 48, the state change of the NOR gate 60 also provides a high state to the input of the OR gate 68, thereby forcing a one value to exist on the output of the D type flip-flop 62. The output from the D-type flip-flop 62 is connected to one input of each of the AND gates 70 and 72, as shown, to deliver the selection signals to the multiplexers 22 and 24 (FIG. 1).

The phase signal on line 54 is passed through the AND gate 48 before the circuit latches as above described, to one input of an OR gate 74 to serve as the input to the D-type flip-flop 64. The output of the D-type flip-flop 64 is inverted by and connected to inverter 78 and applied to a second input of the AND gate 70. In addition, the output of the D-type flip-flop 64 is applied to the second input of the AND gate 72. Thus, depending upon the phase signal on line 54, either AND gate 70 or AND gate 72 will be enabled. This provides an output configuration signal for application to the multiplexers 22 and 24 to select which of the register signals pass to the read channel. The OR gate 74 serves to hold a high value on the input of the D-type flip-flop 64 once a high value, indicating in-phase clock signals, has been set on its output. On the other hand, once the signal on the AND gate 48 goes low upon the latching of the circuit, indicating out-of-phase clock signals, the input to the D-type flip-flop 64 also goes low, thereby changing the multiplexer configuration output from the circuit.

Figure 3:
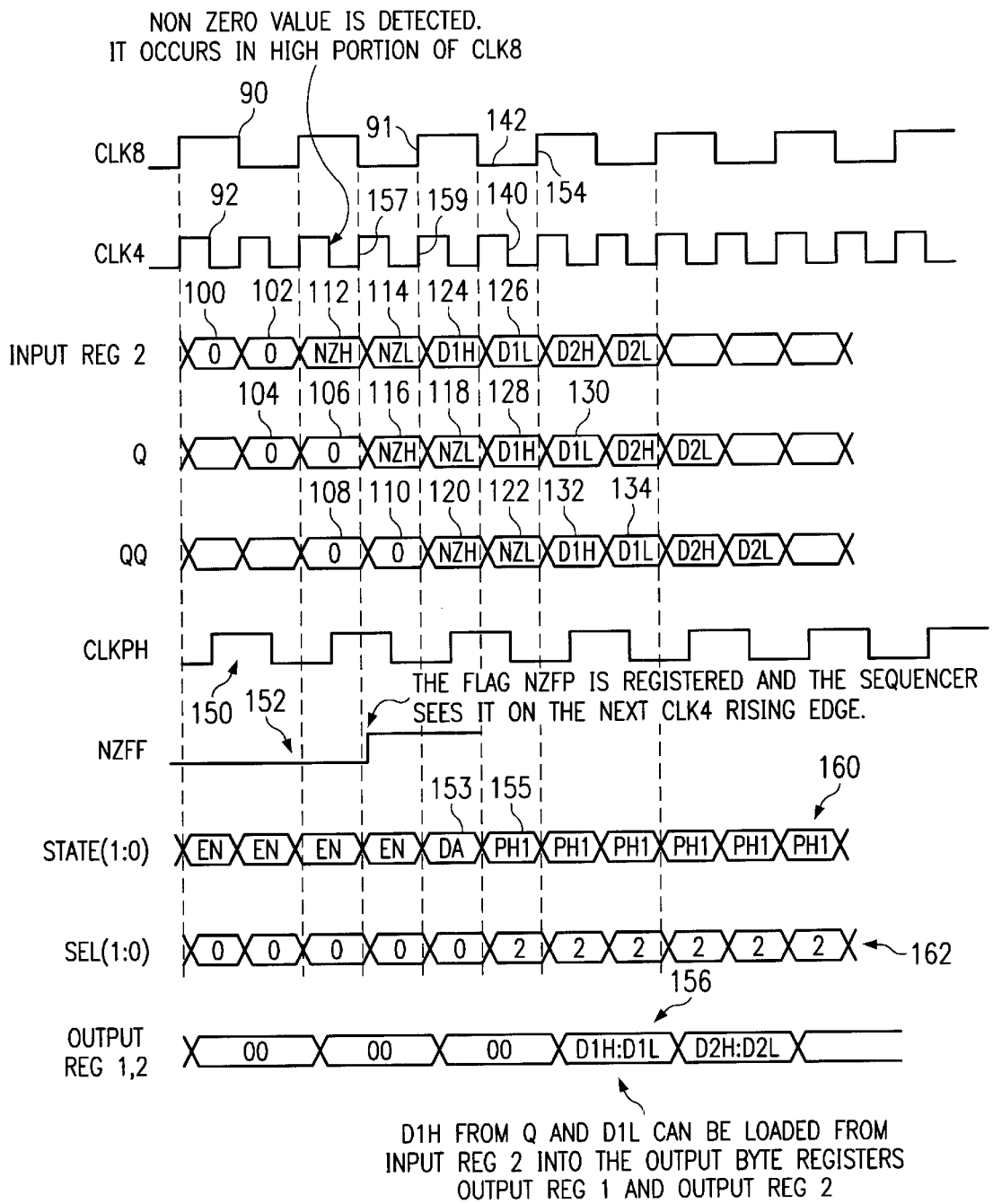
FIG. 3 shows a number of waveforms of in-phase half-word processing illustrating the operation of the interface circuit of FIG. 1, according to a preferred embodiment of the invention.

The operation of the circuit 10 is explained with reference now to the timing diagrams of FIGS. 3 and 4. As mentioned, until a data packet is to be sent, the controller sends a series of zero value words. Thus, in the in-phase half-word implementation, in which only input register 18 is used, the first nibble values 100 and 102 are of zero value. The in-phase timing is shown in FIG. 3. In the in-phase operation, the non-zero flag (NZFF) 152 is set on the next rising edge 157 of CLK4 after detecting the first non-zero value 112 in the input register 18 when CLK8 is at logic 1. The sequencer will not see the NZFF until the next CLK4 rising edge 159. The sequencer then enters the DA state 153. In this case the next marker nibble is skipped and the sequencer waits for the next CLK4 rising edge and enters the PH1 state 155. The data in the input register 18 and pipeline register Q 36 are used to form the low and high nibbles 156 of the 8-bit byte, respectively. This data is then clocked on the CLK8 rising edge 154 into the output registers 26 and 28. From then on the data to be clocked in at each rising CLK8 edge is in input register 18 and register Q 36. Thus, initially, as can be seen, the zero values are successively clocked into register Q 36, providing zero values 104 and 106 therein and subsequently into register QQ 38, registering values 108 and 110 therein.

Following the zero states, as the controller prepares to send data words, it sends a non-zero value word, or flag, to the circuit 10. The first and second non-zero nibbles are labeled "NZL" and "NZH" herein. It can be seen that since the last received nibble NZH occurs during the high portion of CLK8, the signals need to be synchronized to the "in-phase" case. More particularly, waveform 150 shows the clock phase signal developed on line 54 of the circuit of FIG. 2, and signal 152 shows the non-zero flag signal, NZFF, developed on line 45 thereof. Thus, the signals provided on lines 45 and 54 and the resulting multiplexer selection waveforms at the outputs of AND gates 70 and 72 (FIG. 2) are as respectively shown by waveforms 160 and 162. Meanwhile, the non-zero word flag is successively registered into the input register 18 according to waveforms 112 and 114, then into register 36 according to waveforms 116 and 118, and finally into register QQ 38 as waveforms 120 and 122.

Following the non-zero flag, the two word halves or nibbles of the word to be transmitted are delivered to the input register 18, as denoted by the waveforms 124 and 126. The word values are then successively clocked into register Q 36, as shown by the waveforms 128 and 130, and finally into the QQ register 38, as shown by the waveforms 132 and 134.

It should be noted that data in the input register 18 and Q register 36 is clocked into the output registers 22 and 28 on the rising edge of CLK8. But data in the input register 18, register Q 36, and register QQ are moving at each rising edge of CLK4. Thus, in FIG. 3, at the 3rd rising edge of CLK8 91, the second nibble D1H of the first data word is not yet in the input register 16. However, On the 4th rising edge of CLK8 154, register Q 36 and input register 16 contain the whole byte. Thus, at this point, the entire word value is contained in the input register 18, denoted by the waveform values 126 and in the register Q 36, as denoted by the waveform values 128. These values, therefor, can be clocked to the output registers 26 and 28 by the next rising edge 154 of CLK8, as denoted by the waveforms 156.

Figure 4:
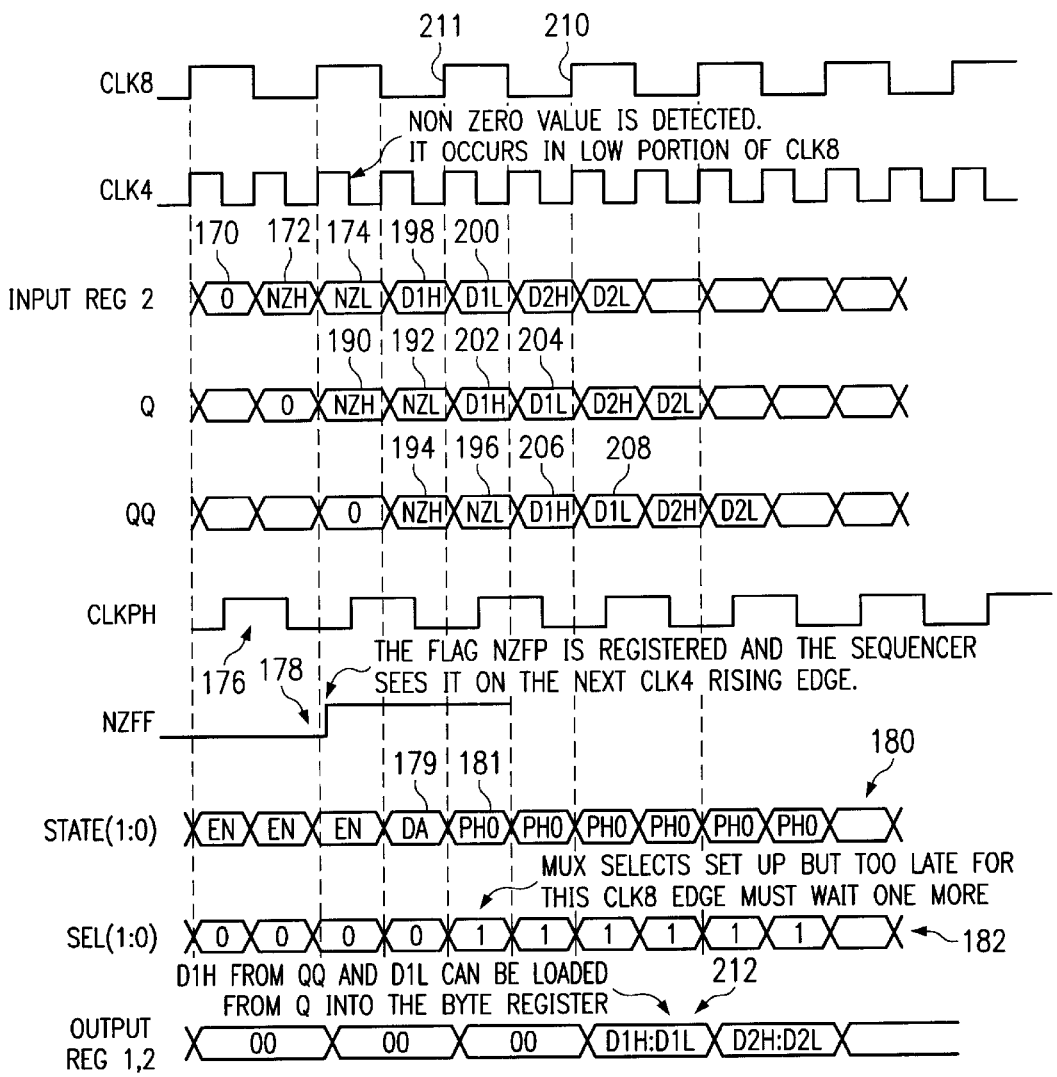
FIG. 4 shows a number of waveforms of in out-of-phase half-word processing illustrating the operation of the interface circuit of FIG. 1, according to a preferred embodiment of the invention.

The "out-of-phase" operation is explained with additional reference now to FIG. 4. In the out-of-phase operation, the non-zero flag, NZFF, 178 is set early, and the sequencer moves to the DA 179 state, then to the PHO state 131. But the CLK8 rising edge 211 occurs before the sequencer has actually entered the PHO state, and the data is not clocked into the output registers 26 and 28 until next CLK8 rising edge 210. At this time, the mode sequencer uses the data in registers Q 36 and QQ 38 to form the 8-bit byte in output register 28 and 26, respectively.

More particularly, as before, following the zero states 170 between data packets, as the controller prepares to send data words, it sends a non-zero value word, or flag, shown by waveforms 172 and 174, to the circuit 10. It can be seen that since the last received nibble NZH occurs during the low portion of CLK8, the signals need to be synchronized to the "out-of-phase" case. More particularly, waveform 176 shows the clock phase signal developed on line 54 of the circuit of FIG. 2, and signal 178 shows the non-zero flag signal, NZFF, developed on line 45 thereof. Thus, the signals provided on lines 45 and 54 and the resulting multiplexer selection waveforms at the outputs of AND gates 70 and 72 are as respectively shown by waveforms 180 and 182. Meanwhile, the non-zero word flag 172, 174 is successively registered into the input register 18, then into register 36 according to waveforms 190 and 192, and finally into register QQ 38 as waveforms 194 and 196.

Following the non-zero flag, the two word halves or nibbles of the word to be transmitted are delivered to the input register 18, as denoted by the waveforms 198 and 200.

Thus, the word values are then successively clocked into register Q 36, as shown by the waveforms 200 and 204, and finally into the QQ register 38, as shown by the waveforms 206 and 208.

Again, it should be noted that when input register 16 contains D1L and register Q 36 contains D1H the rising edge has passed and will not occur again for another CLK4 period. By the time the next (4th) rising edge 210 occurs on CLK8, the data has moved along the pipeline to be contained in register Q 36 and register QQ 38, from which it can be clocked to the output registers 26 and 28. Thus, at this point, the entire word value is contained in the register Q 36, denoted by the waveform values 204 and in the register QQ 38, as denoted by the waveform values 206. These values, therefor, can be clocked to the output registers 26 and 28 by the next rising edge 210 of CLK8, as denoted by the waveforms 212.

Figure 5:
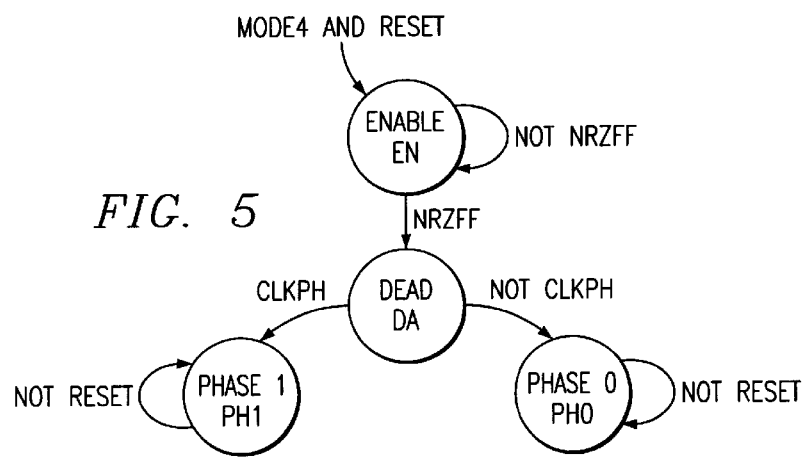
FIG. 5 is a state machine diagram showing the operation of the seqeuncer circuit of FIG. 2, according to a preferred embodiment of the invention.

A state machine diagram for the sequencer logic is shown in FIG. 5. This logic produces the select signals for the multiplexer in front of the output register 26 and output register 28 so that the appropriate data is clocked into to the registers. If the existing data is to be kept, it recirculates synchronously by setting the selection logic of the multiplexer to select the recirculates path. Once the decision is made as to Phase 0 (out-of-phase) or Phase 1 (in-phase) the state machine stays in that configuration until the end of the data transfer, when WRGATE goes low and the entire interface is reset.

It should be noted that, in contrast to the prior art, in the circuit 10, the clocks that are provided are used by the entire read channel, being divided down until the data is transmitted in a serial bit stream to the READ/right heads. It should also be noted that in a latch based design, an extra pipe register may not be needed. However, such a design would not be fully synchronous, and the latch and clock period variations could be a problem in a particular process over voltage and temperature. Also, the edge triggered, master slave flip flops allow the registers to be implemented in a scan path for testability.

It will be appreciated that the interface of the invention is usable on several designs, since it can be easily transported and reused because it is fully synchronous with respect to the on-chip read channel clock. Also, it should be noted that although the interface circuit is illustrated and described with reference to an 8-bit wide word, the principles of the invention can be used with other word lengths, for example, 16, 32, 64, etc. bit wide words.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. An interface circuit to interface data that is transmitted in half-word portions from a controller to a data user, comprising:

a first half-word data input register for receiving a data word in sequential half-word portions, clocked by a first clock signal;

at least second and third data registers, each clocked by said first clock signal, connected to sequentially receive said portions of said data word from said first data register;

first and second data output registers, each clocked by a second clock signal at a frequency half that of said first clock signal, to deliver data therein to said data user;

first and second multiplexers having outputs respectively connected to said first and second data output registers, and each having outputs from said first, second, and third registers connected to inputs thereof;

and a controller to control said multiplexers to pass selected outputs from said first, second, and third registers, operative to determine in which of said three registers said data word portions are contained based upon the relative phase of said first and second clock signals with respect to the time that said data word was received.

2. The circuit of claim 1 further comprising a second half-word data input register, wherein said controller is configurable to enable said first and second half-word data input registers to concurrently receive first and second word portions, and to configure said first and second multiplexers to pass said first and second word portions to said first and second output registers in synchronism with said second clock signal.

3. The circuit of claim 1 wherein said data user is a mass data storage device, and said data is delivered to a read channel therein.

4. The circuit of claim 1 wherein said first and second clock signals are generated by said data user.

5. The circuit of claim 1 wherein said first and second clock signals are generated asynchronously to a clock signal of said controller by which data delivery to said first data input register is controlled.

6. The circuit of claim 1 wherein said data word is 8 bits long.

7. The circuit of claim 1 wherein said data word is 16 bits long.

8. The circuit of claim 1 wherein said data word is 32 bits long.

9. The circuit of claim 1 wherein said controller is configurable to pass said data word directly from an input to an output of said circuit.

10. A half-word synchronous interface circuit to interface a data word that is transmitted in half-word portions from a controller to a data user, comprising:

a first half-word data input register for receiving a data word in sequential half-word portions, clocked by a first clock signal;

at least second and third data registers, each clocked by said first clock signal, connected to sequentially receive said portions of said data word from said first data register;

first and second data output registers, each clocked by a second clock signal at a frequency half that of said first clock signal, to deliver data therein to said data user;

first and second multiplexers having outputs respectively connected to said first and second data output registers, and each having outputs from said first, second, and third registers connected to inputs thereof;

and a controller to control said multiplexers to pass selected outputs from said first, second, and third registers, operative to determine in which of said three registers said data word portions are contained based upon the relative phase of said first and second clock signals with respect to the time that said data word was received.

11. The circuit of claim 10 wherein said data user is a mass data storage device, and said data is delivered to a read channel therein.

12. The circuit of claim 10 wherein said first and second clock signals are generated by said data user.

13. The circuit of claim 10 wherein said first and second clock signals are generated asynchronously to a clock signal of said controller by which data delivery to said first data input register is controlled.

14. The circuit of claim 10 wherein said data word is 8 bits long.

15. The circuit of claim 10 wherein said data word is 16 bits long.

16. The circuit of claim 10 wherein said data word is 32 bits long.

17. The circuit of claim 10 wherein said controller is configurable to pass said data word directly from an input to an output of said circuit.

18. A method for interfacing a data word that is transmitted in half-word portions from a controller to a data user, comprising:

providing clock signals to control a transfer of said data at a first and second clock frequencies, said first clock frequency being half the second clock frequency;

determining whether said first and second clock frequencies are in-phase or out-of-phase when first and second half-word portions of a data word are received;

selectively and concurrently outputting said half-word portions of said data word in a proper order depending upon whether said first and second clock frequencies were determined to be in-phase or out-of-phase.

19. The method of claim 18 further comprising clocking first and second nibbles of said data word into respective first and second registers, or second and third registers depending upon whether said first and second clock frequencies are in-phase or out-of-phase for selective output therefrom.

20. The method of claim 18 wherein said second clock frequency is ½ the frequency of said first clock frequency.

* * * * *